United States Patent
Simon

(10) Patent No.: US 11,824,706 B2
(45) Date of Patent: *Nov. 21, 2023

(54) DETERMINING BLOCKCHAIN LEDGER INDICATES NOTIFICATION AVAILABILITY FOR AN APPLICATION

(71) Applicant: Red Hat, Inc., Raleigh, NC (US)

(72) Inventor: Axel Simon, Farnborough (GB)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/402,886

(22) Filed: Aug. 16, 2021

(65) Prior Publication Data

US 2021/0377099 A1 Dec. 2, 2021

Related U.S. Application Data

(63) Continuation of application No. 16/388,749, filed on Apr. 18, 2019, now Pat. No. 11,108,624.

(51) Int. Cl.
| | |
|---|---|
| *G06F 15/16* | (2006.01) |
| *H04L 41/069* | (2022.01) |
| *G06F 16/182* | (2019.01) |
| *H04L 9/14* | (2006.01) |
| *H04L 41/0686* | (2022.01) |
| *H04L 9/00* | (2022.01) |

(52) U.S. Cl.
CPC ........ *H04L 41/069* (2013.01); *G06F 16/1824* (2019.01); *H04L 9/14* (2013.01); *H04L 41/0686* (2013.01); *H04L 9/50* (2022.05)

(58) Field of Classification Search
CPC ..... H04L 41/069; H04L 41/0686; H04L 9/14; H04L 9/50; G06F 16/1824
USPC ................. 709/202–203, 223–224
See application file for complete search history.

(56) References Cited

U.S. PATENT DOCUMENTS

| | | | |
|---|---|---|---|
| 10,157,078 B2 | 12/2018 | Curtis | |
| 10,365,922 B1 | 7/2019 | Wang et al. | |
| 10,764,160 B1* | 9/2020 | Shtrauch | H04L 9/50 |
| 11,108,624 B2* | 8/2021 | Simon | H04L 9/14 |
| 11,216,780 B1* | 1/2022 | Matheson | G06F 16/22 |
| 11,424,911 B2* | 8/2022 | Narayanaswami | H04L 63/1416 |

(Continued)

FOREIGN PATENT DOCUMENTS

WO 2018/106187 A1 6/2018

OTHER PUBLICATIONS

"ADAMANT is working on Blockchain messaging platform and Push notifications Service," Jun. 3, 2018, Medium, 4 pages. Retrieved on Jul. 10, 2018 from: https://medium.com/adamant-im/adamant-is-working-on-blockchain-messaging-platform-and-push-notifications-service-765972cce50e.

(Continued)

*Primary Examiner* — Bharat Barot

(74) *Attorney, Agent, or Firm* — Womble Bond Dickinson (US) LLP

(57) ABSTRACT

Notification system using a blockchain system. A method of the disclosure includes determining, by a node of a blockchain system, that a notification is available for an application of a computing device. The application is associated with a service platform. The method also includes updating a ledger of the blockchain system to indicate that the notification for the application is available.

18 Claims, 7 Drawing Sheets

(56) References Cited

U.S. PATENT DOCUMENTS

| | | | |
|---|---|---|---|
| 2012/0112908 A1* | 5/2012 | Prykari | H04L 67/55 340/540 |
| 2017/0132615 A1 | 5/2017 | Castinado et al. | |
| 2018/0176228 A1 | 6/2018 | He et al. | |
| 2018/0181759 A1 | 6/2018 | Smith et al. | |
| 2019/0149418 A1* | 5/2019 | Bertsche | G06F 16/1734 707/625 |
| 2019/0363890 A1* | 11/2019 | Johnson | H04L 9/0891 |
| 2020/0026561 A1 | 1/2020 | Slinger et al. | |
| 2020/0084045 A1* | 3/2020 | Cohen | H04L 9/14 |
| 2020/0110824 A1 | 4/2020 | Iwama et al. | |
| 2020/0143337 A1* | 5/2020 | Conroy | G06F 16/1824 |
| 2020/0220770 A1 | 7/2020 | Kawahara | |

OTHER PUBLICATIONS

Karsipan, "ARCBLOCK application to work on different blockchains," 2018, 32 pages.

Hashemi, S. H., et al., "Decentralized User-Centric Access Control using PubSub over Blockchain," Sep. 29, 2017, University of Illinois at Urbana-Champaign, 15 pages.

Zupan, N., et al., "Demo: HyperPubSub: a Decentralized, Permissioned, Publish/Subscribe Service using Blockchains," Dec. 11-15, 2017, Technical University of Munich; Middleware Systems Research Group; University of Toronto, pp. 15-16.

* cited by examiner

DETERMINING BLOCKCHAIN LEDGER INDICATES NOTIFICATION AVAILABILITY FOR AN APPLICATION

CROSS REFERENCE TO RELATED APPLICATIONS

This application is a continuation of U.S. patent application Ser. No. 16/388,749, filed Apr. 18, 2019, the contents of which are incorporated by reference herein.

TECHNICAL FIELD

Aspects of the present disclosure relate to notifications, and more particularly, to a notification system using a blockchain system.

BACKGROUND

Various types of applications may be installed on the computing device. For example, an email application may allow a user to send and receive emails. In another example, a chat application may allow a user to send and receive messages (e.g., chat messages, text messages, etc.). Examples of applications include email applications, chat or messaging applications, social media applications, streaming media applications, ride sharing applications, financial applications, etc. Each application may be associated with a service platform (which may also be referred to as an application platform). The service platform may provide an application to a computing device (e.g., allow the computing device to download and install the application). The service platform may also communicate data with the application to allow the application to execute or operate. For example, a service platform may transmit email messages to an email application. In another example, a service platform may transmit streaming media to a streaming media application. In a further example, a service platform may transmit social media messages (e.g., social media posts) to a social media application.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
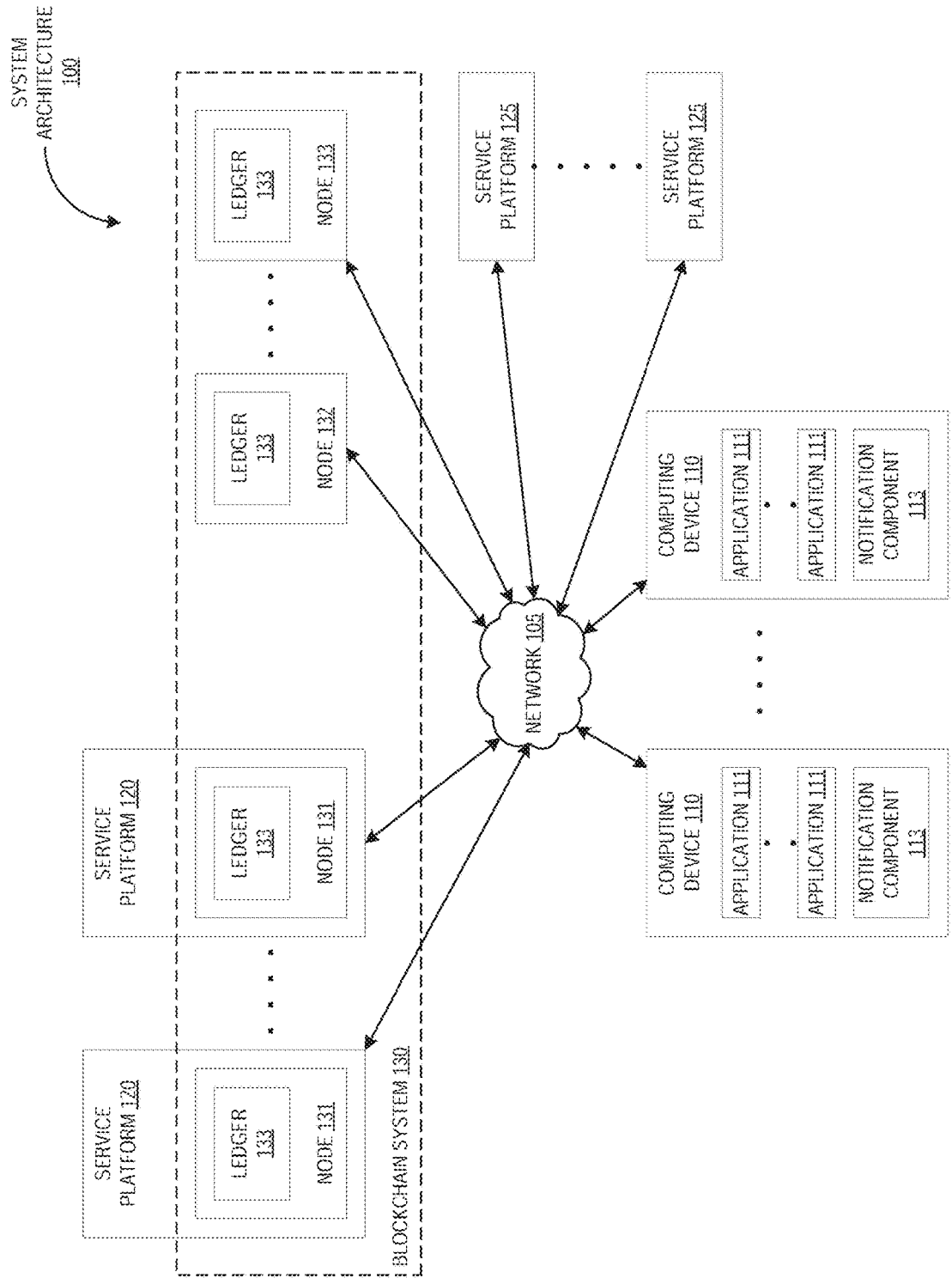
FIG. 1 is a block diagram that illustrates an example system architecture, in accordance with some embodiments of the present disclosure.

As discussed above, various types of applications may be installed on the computing device. Examples of applications include email applications, chat or messaging applications, social media applications, streaming media applications, ride sharing applications, financial applications, etc. Each application may be associated with a service platform (e.g., an application platform). The service platform may provide an application to a computing device (e.g., allow the computing device to download and install the application). The service platform may also communicate data with the application to allow the application to execute or operate.

The various service platforms may generate notifications (e.g., messages) for the applications on the computing devices. The notifications may inform or provide the applications with information that may be used by the applications. For example, the notifications may inform an application when there is data (e.g., email messages, chat messages, etc.) available for the application. In another example, the notification may inform an application about recommended social media posts, recommend streaming media, etc., for a user of the application or computing device. Each application may communicate with a respective service platform to determine whether there are notifications for the application. This may cause the computing device to constantly use energy (e.g., battery power) and processing power to communicate with the different service platforms. For example, each application may check at different time intervals for notifications. Because each application checks for notifications at different times, a computing device may be constantly communicating with a network (e.g., constantly transmitting or receiving data from a wireless network) which may cause the computing device to use more power. For example, the computing device may be unable to power down or reduce the power used by a transceiver (e.g., a radio-frequency transceiver) because the computing device will keep checking at different times or time intervals, for notifications for different applications.

A centralized server (or some other application or computer process) may be used to provide notifications for the different applications to computing devices. For example, the centralized server may receive all of the notifications for the different applications (from different service or application platforms). A service on the computing device may periodically check the centralized server for notifications for the applications on the computing device. However, the centralized server may be under the control of a single entity, which may result in privacy concerns or issues. For example, a user may not prefer to give a single entity access to all of the notifications for all of the applications on the user's computing device. In addition, using a centralized server or system may result in problems if portions of the centralized server or system become inoperable. For example, if the centralized server has network connectivity issues, or if the centralized server fails (e.g., crashes, becomes inoperable, etc.), then the computing devices may not be able to access notifications for their respective applications.

The present disclosure addresses the above-noted and other deficiencies by using a blockchain system. The blockchain system may include a ledger that is distributed across all of the nodes in the blockchain system (e.g., a distributed ledger). The distributed ledger may include a record of notifications generated for various applications on various computing device. The entries of the ledgers (which may store the notifications) are encrypted to help prevent unauthorized access. Each computing device may use a notification component to access the distributed ledger to determine whether there are notifications available for the applications on the computing device.

FIG. 1 is a block diagram that illustrates an example system architecture 100, in accordance with some embodiments of the present disclosure. The system architecture 100 includes a network 105, computing devices 110, service platforms 120, service platforms 125, and a blockchain system 130. As discussed above, the service platforms 120 and service platforms 125 may generate notifications for the applications 111 that are on the computing devices 110. The notifications may provide information to the applications 111 or may cause the applications 111 to perform certain actions, functions, operations, etc.

As illustrated in FIG. 1, the system architecture includes a blockchain system 130. In one embodiment, the blockchain system 130 may be a system that uses a ledger 133 to record transactions (e.g., transmitting messages, processing messages, results of actions, etc.) in the system. The ledger 133 includes a plurality of blocks which are linked together and are secured using cryptographic functions. For example, each block may include a hash of the previous block, a timestamp, and other data (e.g., a copy of the message, a result, etc.). The blockchain system 130 includes a set of nodes 131 (e.g., one or more nodes 131, a plurality of nodes 131, etc.) coupled to each other via a network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as wireless fidelity (WiFi) connectivity to the network 105 and/or a wireless carrier system that can be implemented using various data processing equipment, communication towers (e.g. cell towers), etc. The network 105 may carry communications (e.g., data, message, packets, frames, etc.) between the nodes 131 and 132, the service platforms 120 and 125, and the computing devices 110.

A node 131 may be a combination of one or more computing devices. A computing device may be any suitable type of computing device or machine that has a programmable processor including, for example, server computers, desktop computers, laptop computers, tablet computers, smartphones, set-top boxes, etc. In some examples, a computing device may comprise a single machine or may include multiple interconnected machines (e.g., multiple servers configured in a cluster). A node 131 may also be one or more virtual environments. In one embodiment, a virtual environment 113 may be a virtual machine (VM) that may execute on a hypervisor which executes on top of the OS for a computing device. The hypervisor may manage system sources (including access to hardware devices, such as processors, memories, storage devices). The hypervisor may also emulate the hardware (or other physical resources) which may be used by the VMs to execute software/applications. In another embodiment, a virtual environment may be a container that may execute on a container engine which executes on top of the OS for a computing device, as discussed in more detail below. The container engine may allow different containers to share the OS of a computing device (e.g., the OS kernel, binaries, libraries, etc.). The blockchain system 130 may use the same type or different types of virtual environments. For example, all of the nodes 131 may be VMs. In another example, all of the nodes 131 may be containers. In a further example, some of the nodes 131 may be VMs, other nodes 131 may be containers, and other nodes may be computing devices (or groups of computing devices).

In one embodiment, the blockchain system 130 may be a permissioned blockchain. A permissioned blockchain may be a blockchain where the nodes (e.g., nodes 131 and 132) are authenticated or given permission to be included in the blockchain system. For example, the nodes 131 and 132 may have been previously verified or authenticated with an administrator or an administrative group that manages or oversees the blockchain system 130. This may indicate that the nodes 131 and 132 are trusted by the blockchain system 130 and thus security requirements or operations for accessing the ledger 133 that may generally be used in blockchain systems, may be relaxed or reduced. For example, the computational task (e.g., a computational challenge) for creating new entries may be removed or the complexity of the computational task may be reduced.

In another embodiment, the blockchain system 130 may be a permission-less blockchain. A permission-less blockchain may be a blockchain where the nodes (e.g., nodes 131 and 132) are not previously authenticated or given permission to be included in the blockchain system. Thus, any node (e.g., any computing device, any server computer, etc.) may join the blockchain system and attempt to create entries in the ledger 133.

The blockchain system 130 may reach a consensus (e.g., a majority agreement) about the ledger 133 (e.g., the content of the ledger 133 or the content of the entries) using various functions, algorithms, operations, etc. For example, a Byzantine fault tolerance algorithm may be used by the nodes 131 and 132 to reach a consensus if different nodes have different version of the ledger 133. In another example, the nodes 131 and 132 may rotate between each other when creating entries in the ledger 133. For example, after a period of time has passed, a node 131 and 132 that has not written to the ledger 133 may be allowed to create an entry in the ledger. This may be referred to as a proof of time or a proof of elapsed time system to allow nodes to update the ledger 133. In a further example, the nodes 131 and 132 may also provide collateral to be allowed to update the ledger 133. For example, an entity, company, organization, etc., that owns or manages the nodes 131 and 132 may pay a deposit to be allowed to be included in the blockchain system 130 and to access the ledger 133. The entity may be able to get the deposit back if the entity does not perform unauthorized or inappropriate operation/actions. For example, if the entity does not attempt to add incorrect information to the ledger 133, the entity may obtain a reward for its participation in maintaining and updating the ledger's information and may be able to recoup the deposit if the entity no longer wants to participate in the blockchain system 130. If the entity does attempt to add incorrect information to the ledger 133, the entity may lose the deposit. This may be referred to as a proof of stake system.

In one embodiment, the ledger 133 (e.g., a distributed ledger) may be a record of the notifications that are generated by the service platforms 120 and the service platforms 125 for the different applications 111 on the computing devices 110. For example, an entry (e.g., a record, a block, etc.) may be added to the ledger 133 each time a notification is generated by a service platform 120 or 125. In another example, an entry may include multiple notifications generated by a service platform 120 or 125. Each ledger 133 may be stored in a data store (not illustrated in the figures) of a respective node 131. A data store may include a persistent storage. A persistent storage may be one or more devices that are capable of storing data. A persistent storage may be a local storage unit or a remote storage unit. Persistent storage may be a magnetic storage unit, optical storage unit, solid state storage unit, electronic storage units (main memory, cache, random access memory (RAM)), or similar storage unit. Persistent storage may also be a monolithic/single device or a distributed set of devices.

In one embodiment the ledger 133 may be used to store entries that indicate whether notifications are available for multiple service platforms. For example, the ledger 133 may include entries that indicate whether notifications are available for service platforms 120 and service platforms 125. In another embodiment (not illustrated in the figures), the blockchain system 130 may include one ledger for each service platform 120 and each service platform 125. In a further embodiment (not illustrated in the figures) the blockchain system 130 may include one ledger for each user of the computing devices 110, or for each computing device 110.

In another embodiment, a node 131 or a node 132 may periodically remove entries in the ledger 133. For example, after a threshold period of time has elapsed after an entry is created (e.g., after a few hours, a few days two weeks, or some other appropriate period of time), a node 131 or a node 132 may remove old entries. This node 131 or node 132 may remove these entries because the notifications included in or indicated by these entries may have already been provided to the applications 111. In some embodiments, the nodes 131 or 132 may check whether the notifications have been provided to the applications 111 before deleting the entries. For example, the nodes 131 or 132 may communicate with the service providers 120 and 125 to determine whether the notifications have been provided to the applications 111.

In one embodiment, the blockchain system may use asymmetric encryption to write information to and read information from the ledger. Asymmetric encryption may also be referred to as public/private key encryption. For example, a service platform 120 may use a public key of a computing device 110 or an application 111 to encrypt an entry or a portion of an entry in the ledger 133. The corresponding private key (of the public/private key pair) of the computing device 110 or the application 111 may be used to decrypt entry or the portion of the entry. Using asymmetric encryption (e.g., public/private key encryption) allows the ledger 133 to securely and privately indicate to computing devices 110 that notifications for one or more applications 111 are available, even though the ledger 133 may be accessible by all of the nodes 131, 132, or computing devices 110. For example, even though multiple service platforms 120 or multiple computing devices 110 may have access to the ledger 133, the entries (or portions of entries) are encrypted to prevent unauthorized access to the entries (e.g., to prevent another service platform 120 or another computing device 110 from readying an entry in the ledger 133).

In some embodiments, the use of a computationally expensive task when creating entries in the ledgers 133 may be reduced or relaxed, due to the use of the ledger 133 for notification purposes. A general blockchain system may use a computationally expensive task (e.g., a task that uses a large amount of processing power or capability, such as computer large hashes, large numbers, etc.) to help maintain the authenticity or integrity of a ledger (e.g., a distributed ledger). Relaxing or reducing the computational task may allow the blockchain system 130 to create entries more quickly which may be useful because notifications for the applications 111 may be generated frequently (e.g., hundreds, thousands, or millions may be generated per few seconds).

In one embodiment, a node 131 may determine that a notification is available for an application 111 executing on a computing device 110. For example, the node 131 may be part of a service platform 120. The service platform 120 may be associated with the application 111. For example, the application 111 may be installed from or provided by the service platform 120. In another example, the application 111 may communicate data with the service platform 120 when the application performs various actions, operations, functions, etc. Because the node 131 may be part of the service platform 120, the node 131 may be aware when a notification is available for an application 111. For example, if the service platform 120 is an email or messaging platform, the service platform 120 may be aware when a user of a computing device 110 receives an email or message. The service platform 120 may generate a notification for an application 111 (e.g., an email or chat application) to indicate that the user has receive an email or message.

In one embodiment, a node 132 may determine that a notification is available for an application 111 executing on a computing device 110. As illustrated in FIG. 1, the nodes 132 are not part of a service platform. For example, the nodes 132 may be computing devices, VMs, container, etc., that are separate from any service platform 120. A service platform 125 may be a service platform that does not have a node that is part of the blockchain system 130. The service platform 125 may transmit a message (or other data) to a node 132 to indicate that a notification is available for an application 111 (that is associated with the service platform 125) on a computing device 110. The node 132 may receive the message and determine that a notification is available for the application 111. The message may include any combination of identifiers for one or more applications 111, identifiers for computing devices 110, and identifiers for users of the computing devices 110.

In one embodiment, a node 131 or a node 132 may update the ledger 133 (e.g., a distributed ledger) to indicate that a notification is available for an application 111 (of a computing device 110) is available. For example, the node 131 or the node 132 may add an entry into the ledger 133. The entry may include data (e.g., alphanumeric text, a message, etc.) indicating that a notification is available for an application 111. For example, the entry may include a name or identifier for an application. In another example, the entry may include a name or identifier for a computing device 110. In a further example, the entry may include a name or identifier for a user of a computing device 110 (e.g., a username, an email address, an employee number, etc.). The entry may also optionally include data that may provide additional information about the notification. For example, the entry may include data indicating that the notification is to inform a user that an email or message has been received. In another example, the entry may include that that the notification is to inform a user about a recommended streaming video (e.g., to recommend a streaming video to the user). In a further example, the entry may include the content of the notification (e.g., text, image, audio, video, other multimedia, etc.).

In one embodiment, a node 131 or a node 132 may not update the ledger 133 (e.g., may not add an entry to a ledger 133) until a threshold number of notifications are available. For example, the node 131 may determine whether a threshold number of notifications (e.g., ten notifications, fifty notifications, or some other appropriate number of notifications) for different applications 111 and different computing devices 110 have been generated by the service platform 120. If the threshold number of notifications has been generated by the service platform 120, the node 131 may create an entry in the ledger 133 and may include data for all of the notifications (e.g., the threshold number of notifications) in the new entry. For example, the node 131 may create an entry in the ledger 133 and the entry may indicate that multiple notifications for one or more applications 111 (e.g., for the same or different applications 111) are available. If the threshold number of notifications has not been generated by the service platform 120, the node 131 may refrain from creating an entry in the ledger 133 until the threshold number of notifications has been generated.

In one embodiment, a node 131 or a node 132 may not update the ledger 133 (e.g., may not add an entry to a ledger 133) until a period of time has elapsed. For example, a node 132 may determine whether ten seconds, thirty second, one minute, or some other appropriate period of time has passed. If the period of time has elapsed, the node 132 may create an entry in the ledger 133 and may include data for all of the notifications generated during the period of time in the new entry. For example, the node 132 may create an entry in the ledger 133 and the entry may indicate that multiple notifications for one or more applications 111 (e.g., for the same or different applications 111) are available. If the period of time has not elapsed, the node 131 may refrain from creating an entry in the ledger 133 until the period of time has elapsed. In some embodiments, the both a threshold period of time and a threshold number of notifications may be used. For example, a node 131 or node 132 may update a ledger if two minutes have elapsed, or if twenty notifications have been received.

In one embodiment, a node 131 or a node 132 may receive a message from a computing device 110. The message may be a request to determine whether one or more notifications are available for one or more application 111 on the computing device 110. For example, the message may be a request to determine whether there are notifications for an email application, a messaging application, a social media application, and a streaming media application of the computing device 110. The message received from the computing device 110 may include data one or more identifiers for the one or more applications 111, an identifier for the computing device 110, an identifier for a user of the computing device 110. In some embodiments, the request may include multiple identifiers (e.g., for the computing device 110, for the user of the computing device 110, etc.). The notification component 113 may include the multiple identifiers to make it more difficult for other users or computing devices to determine which identifier the notification component 113 is interested in. For example, the notification component 113 may include five different user identifiers, but the notification component 113 may be interested in determining whether there are notifications for two (or some other appropriate number) of those identifiers). This may further increase security and privacy by obscuring the subset of identifiers that the notification component 113 is interested in.

In one embodiment, the node 131 or node 132 may determine whether the ledger 133 indicates that notifications are available for the one or more applications 111 based on the data in the message received from the computing device 110. For example, the node 131 or node 132 may analyze the entries of the ledger 133 using identifiers for the one or more applications 111 and an identifier for the computing device 110 (or an identifier for a user of the computing device 110, such as an email address, a username, etc.). This may allow the node 131 or the node 132 to determine whether entries of the ledger 133 include notifications for the one or more applications 111.

In one embodiment, if there are notifications available for the one or more applications 111, the node 131 or node 132 may transmit a message to the computing device 110 indicating that one or more notifications for one or more applications 111 are available. For example, the node 131 or the node 132 may transmit a message with data (e.g., text, numbers, lists, etc.) indicating which applications 111 have notifications available.

In one embodiment, a computing device 110 may check the ledger 133 to determine whether one or more notifications are available for one or more applications 111 of the computing device 110. For example, a notification component 113 of a computing device 110 may transmit a message to a node 131 or a node 132, and the message may be a request for the node 131 or node 132 to check whether there are notifications available for the applications 111 of the computing device. The notification component 113 may receive a message with data indicating that there are notifications available. For example, the notification component 113 may receive a message with a list of applications 111 that have notifications available. In another embodiment, the notification component 113 may access the ledger 133 (e.g., read the ledger 133) via a node 131 or a node 132. For example, the notification component 113 may request entries (e.g., blocks) of the ledger 133 from a node 131 and may read the entries to determine whether notifications are available for the applications 111.

In one embodiment, the computing device 110 may transmit a message to a service platform 120 or a service platform 125 in response to determine that a notification is available for an application 111 on the computing device 110. For example, the notification component 113 may determine that a first application 111 has a notification available based on one or more entries in the ledger 133. The notification component 113 may transmit a message to a service platform 120 (or service platform 125) that is associated with the first application 111. The message may request the notification for the first application 111 from the service platform 120. The service platform 120 may transmit the notification for the first application to the computing device 110. For example, the service platform 120 may transmit a message that includes a notification to inform the first application 111 that email messages have been received for a user of the computing device 110. The notification component 113 may provide the notification to the first application 111. In another embodiment, the notification component 113 may transmit a message to the first application 111 indicating that notifications are available and the first application 111 may retrieve the notifications from the service platform 120.

In one embodiment, the notification component 113 may determine whether notifications are available for multiple (or all) applications 111 on a computing device 110. For example, rather than having each application 111 communicate separately with the different service platforms 120 and 125, the notification component 113 may communicate with the nodes 131 or 132. For example, the notification component 113 may transmit request to 131 to determine whether notifications are available for a first application 111 and a second application 111. The notification component 113 may receive messages from the node 131 indicating that there are notifications available for the first application 111 and the second application 111. The notification component 113 may retrieve the notifications from respective service platforms 120 or 125 for the first application 111 and the second application 111.

As discussed above, the service platforms 120 and 125 may generate notifications for the various applications 111 that are associated with the service platforms 120 and 125. These notifications may indicate certain information to users of the computing device. For example, these notifications may indicate that email or messages are available, may indicate that a service platform 120 or 125 has performed an action, may indicate recommendations for a user, etc. If each application 111 were to communicate with the different service platforms 120 and 125 separately, this may cause a computing device 110 to use more energy and computing power. For example, each of the applications 111 may check for notifications at different time intervals. This may cause the computing device 110 to constantly use energy (e.g., battery power) and processing power to communicate with the different service platforms 120 and 125, as discussed above. For example, the computing device 110 may be constantly transmitting and receiving radio-frequency signals because different applications 111 may check for notifications at different time intervals, which may not allow the computing device 110 to save power by powering down a radio-frequency transceiver. The notification component 113 may determine whether there are notifications for the applications 111 using periodic communications. Because the notification component 113 sends the communications, the applications 111 may not check for notifications are their respective, different intervals. Instead, the applications 111 may wait for notifications from the notification component 113 or may wait until the notification component 113 informs the applications 111 that there are notifications available. This allows the computing device 110 to reduce the number of communications (e.g., number of messages) with the service platforms 120 and 125 which reduces the energy and computing power used by the computing device 110. For example, if the notification component 113 checks for notifications for all of the applications 111 every one minute (or other appropriate period of time), the computing device 110 may be able to power down a radio-frequency transceiver in between the one minute intervals, to reduce the power used by the computing device 110.

In one embodiment, the blockchain system 130 may allow for the notifications generated by different service platforms 120 and 125 to be accessible at a single location or source. In addition, the blockchain system 130 may prevent the loss of notifications because the ledger 133 is distributed across multiple nodes 131 and 132. For example, there may be hundreds, thousands, or some appropriate number of nodes 131 and 132, which may store a copy of the ledger 133. This prevents the system architecture 100 from suffering an outage and being unable to process or receive notifications, because it may be very unlikely for all of the nodes 131 and 132 to become inoperable (e.g., to crash, to go down, etc.). In addition, the entries of the ledger 133 are encrypted (e.g., via public/private keys) which prevents a single entity or a single system from having access to all of the notifications for a user or a computing device 110. Furthermore, the security of the blockchain system 130 (e.g., the encryption, the calculation for creating entries/blocks, the majority agreement or voting on the content of the ledger 133) may allow the list of notifications to be stored more securely and to be more resistant to tampering or fraud (e.g., malicious users modifying notifications, deleting notifications, or adding fake notifications). Lastly, the distributed nature of the blockchain system 130 may allow a computing device 110 to obtain notifications more quickly. For example, the nodes 131 and 132 may be distributed geographically such that a node 131 may be closer to a computing device 110 or may be faster to access, than a service platform 120. This may allow the computing device 110 to obtain the notifications more quickly. In addition, if a particular node 131 or 132 used by a computing device 110 to retrieve notifications does become inoperable or in accessible, the distributed nature of the blockchain system 130 may allow the computing device 110 to retrieve notifications via another node 131 or 132.

Figure 2:
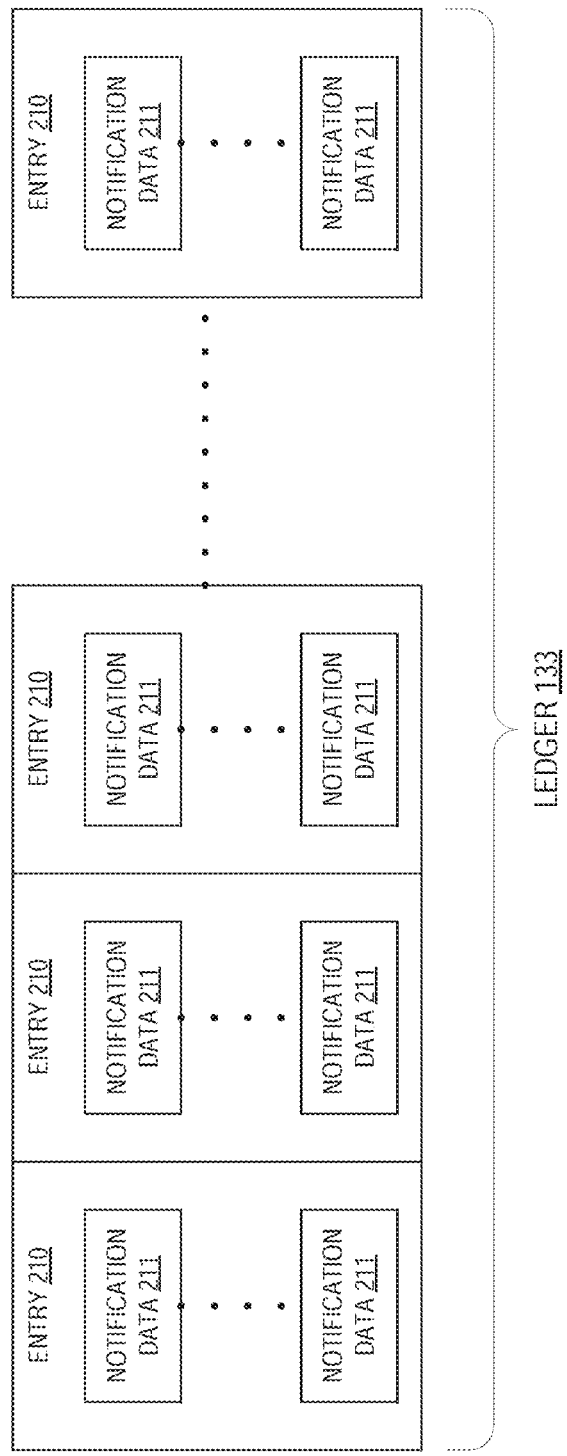
FIG. 2 is a block diagram that illustrates an example ledger, in accordance with some embodiments of the present disclosure.

FIG. 2 is a block diagram that illustrates an example ledger 133, in accordance with some embodiments of the present disclosure. The ledger 133 may also be referred to as a distributed ledger. Copies of the ledger 133 may be stored on nodes of a blockchain system. For example, each node of the blockchain system may store a copy of the ledger 133, as discussed above. In one embodiment, the distribute ledger 133 may be a record of notifications that are generated for applications of computing devices, as discussed above.

A service platform may generate a notification for an application of a computing device, as discussed above. For example, a notification may inform an email application that new emails for a user have been received. In another example, a notification may inform a social media application that new social media posts have been posted to a social media platform. In one embodiment, a first node may create block 210 in the ledger 133, each time a notification is generated for an application. The block 210 may include notification data 211. The notification data 211 may include one or more of an identifier for an application, an identifier for a computing device, an identifier for a user of a computing device, and additional data (e.g., the content of a notification). The notification data 211 may also include the content of a notification. For example, the notification data 211 may include text, audio, video, etc.

As illustrated in FIG. 2, each entry 210 of the ledger 133 may include multiple notification data 211. Each notification data 211 may be for a notification for an application of a computing device. Thus, each entry 210 may include multiple notifications for multiple applications on multiple computing devices. In other embodiments, each entry 210 may include one notification for one application on one computing device.

In some embodiments, one or more entries 210 may be removed (e.g., deleted) from the ledger 133, as discussed above. For example, the first entry 210 may include notification data 211 for notifications that have already been delivered or provided to their respective applications on their respective computing devices. A node in the blockchain system may determine that these notifications have already been delivered (e.g., may transmit messages to the service platforms to confirm that the notifications have been delivered) and may remove the first entry 210.

Figure 3:
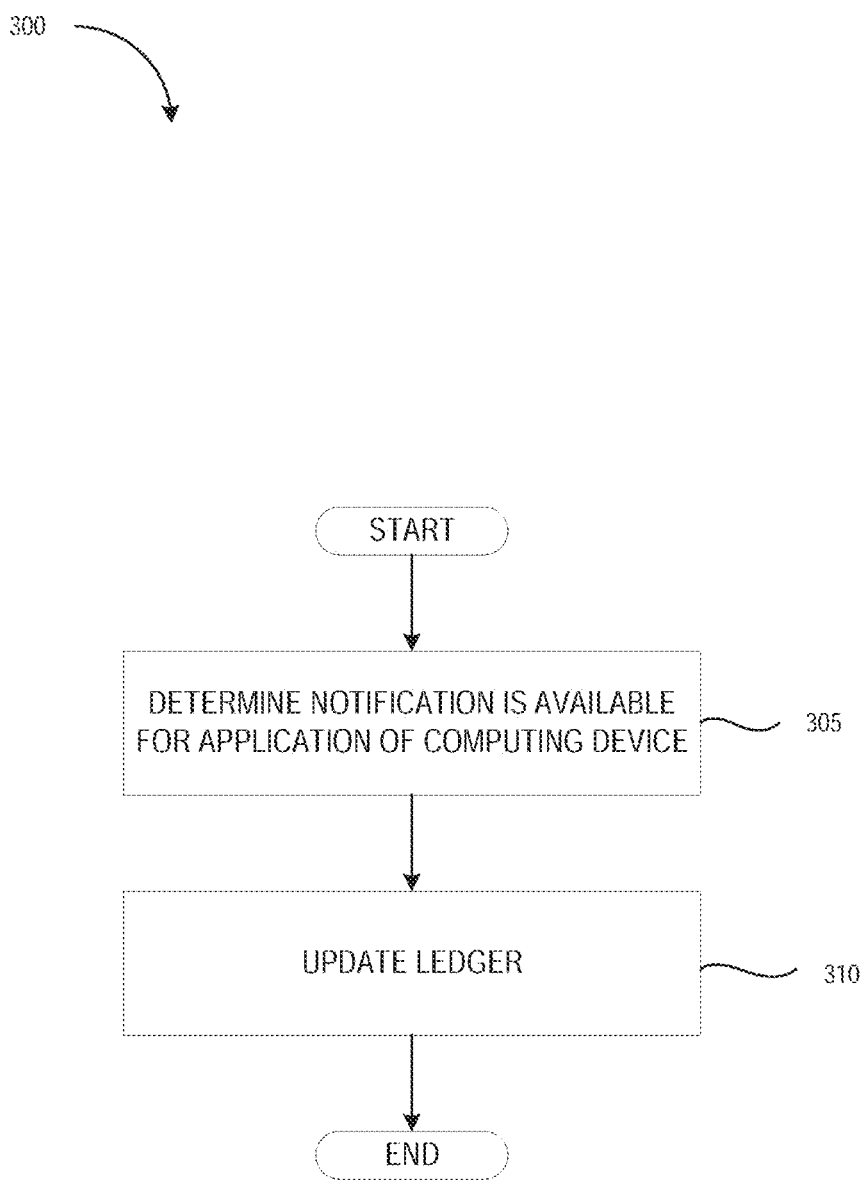
FIG. 3 is a flow diagram of a method of communicating a notification to an application, in accordance with some embodiments.

FIG. 3 is a flow diagram of a method 300 of communicating a notification to an application, in accordance with some embodiments. Method 300 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 300 may be performed by a node (e.g., node 131 illustrated in FIG. 1), and/or one or more computing devices.

The method 300 begins at block 305, where the method 300 determines that a notification is available for an application of a computing device. For example, the method 300 may receive a message of some other data from a service platform indicating that a notification has been generated for an application on a computing device. In another example, the method 300 may be aware that a notification is available or has been generated for an application because the method 300 may be performed by a computing device of a service platform. At block 310, the method 300 may update a ledger (e.g., a distributed ledger). The method 300 may update the distributed ledger to indicate that a notification is available for the application. For example, the method 300 may add an entry with notification data to the ledger 300. The method 300 may consolidate multiple notifications (e.g., wait until there are a threshold number of notifications) into one entry, as discussed above. The method 300 may also periodically create a new entry (e.g., create a new entry every ten seconds or some other appropriate period of time), as discussed above.

Figure 4:
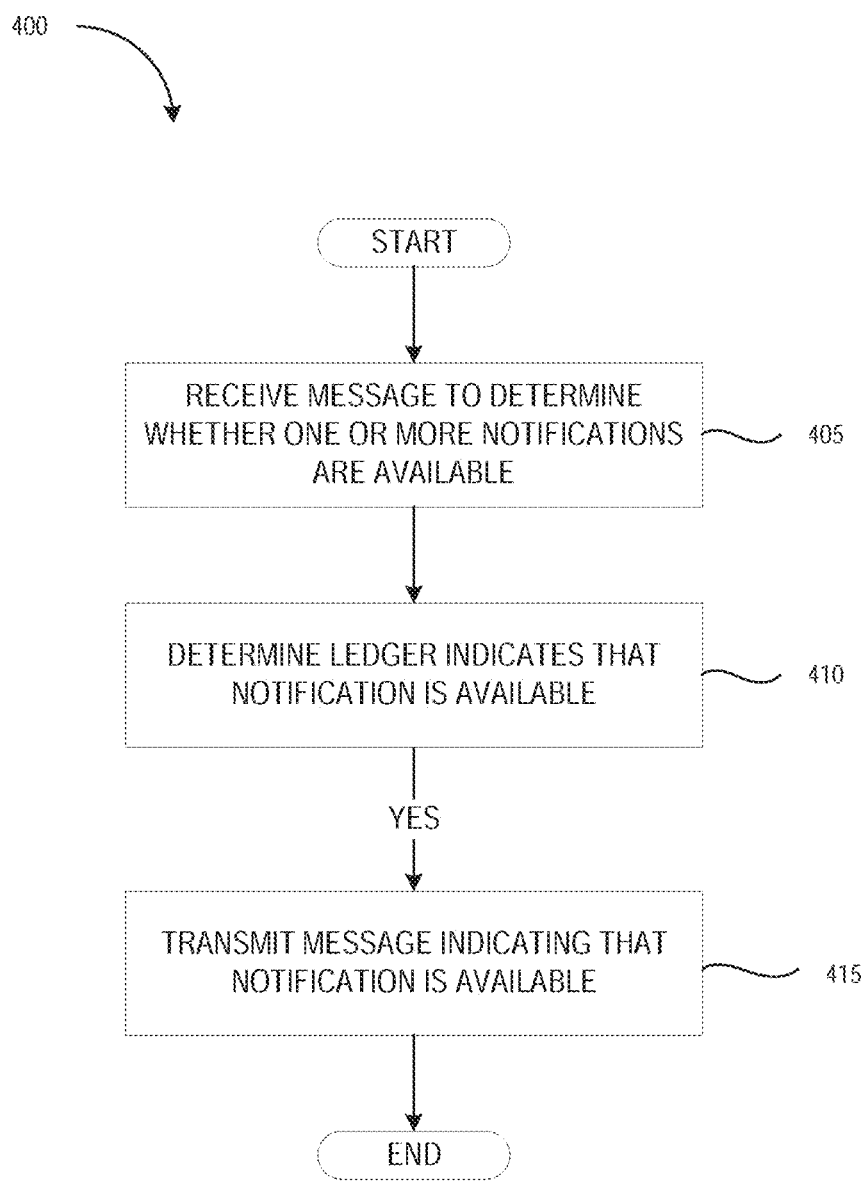
FIG. 4 is a flow diagram of a method of communicating a notification to an application, in accordance with some embodiments.

FIG. 4 is a flow diagram of a method 400 of communicating a notification to an application, in accordance with some embodiments. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by a node (e.g., node 131 illustrated in FIG. 1), and/or one or more computing devices.

The method 400 begins at block 405, where the method 400 receives a message from a computing device to determine whether one or more notifications are available for one or more applications on the computing device (e.g., one or more applications executing on the computing device). The message may include a combination of an identifier for the computing device, an identifier for a user of the computing device, and one or more identifiers for the one or more applications. At block 410, the method 400 determines that the ledger indicates that one or more notifications are available. For example, the method 400 may analyze entries of the ledger and may determine whether there are entries that include an identifier for a first application on the computing device and/or an identifier for the user of the computing device. At block 415, the method 400 may transmit a message indicating that one or more notifications are available. For example, the method 400 may transmit a message with a list of entries that include the notifications. In another example, the method 400 may transmit the notifications to the computing device (e.g., may transmit the entries, which may be fully or partially encrypted, to the computing device).

Figure 5:
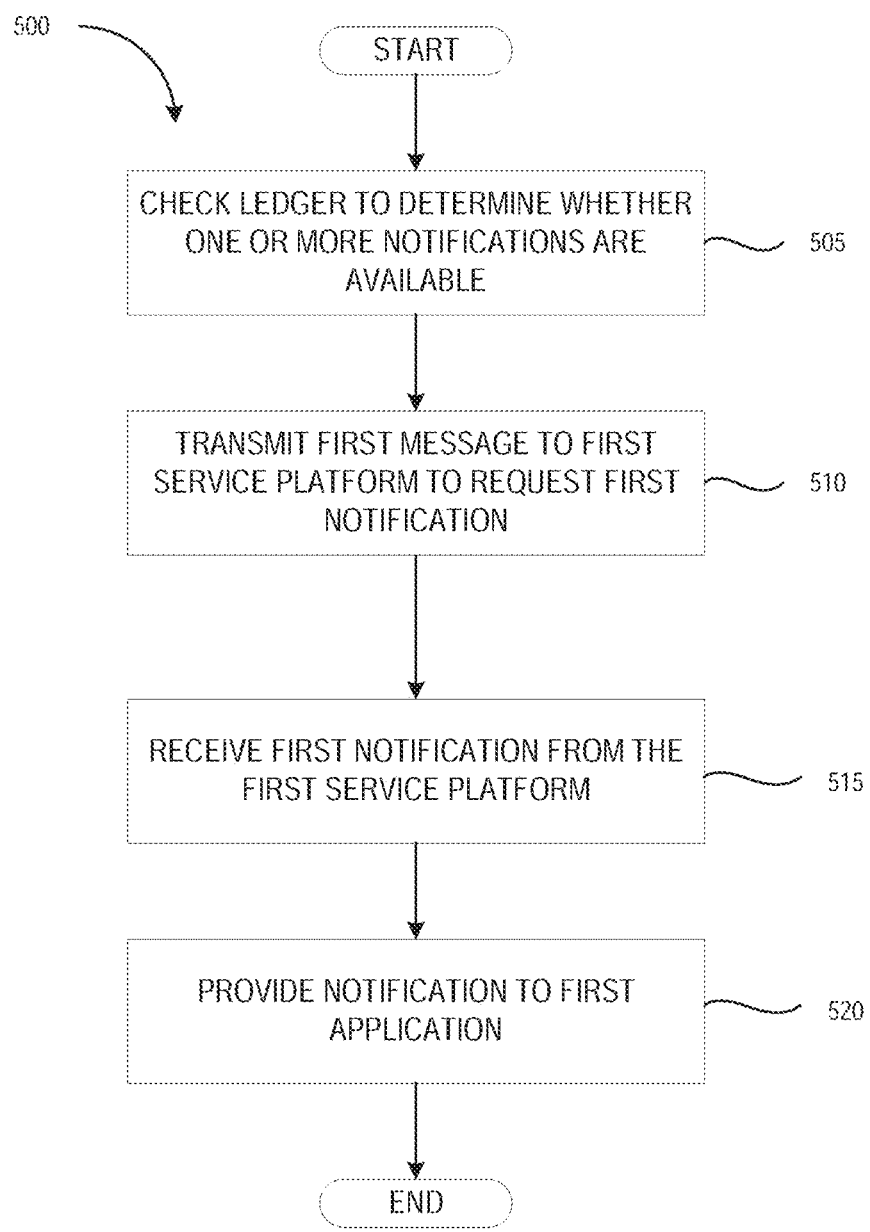
FIG. 5 is a flow diagram of a method of communicating a notification to an application, in accordance with some embodiments.

FIG. 5 is a flow diagram of a method 500 of communicating a notification to an application, in accordance with some embodiments. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 500 may be performed by a notification component (e.g., notification component 113 illustrated in FIG. 1) and/or one or more computing devices.

The method 500 begins at block 505, where the method 500 checks a ledger (e.g., a distributed ledger) to determine whether one or more notifications are available for one or more applications of a computing device. The ledger may be part of a blockchain system as discussed above. For example, the method 500 may transmit a message with a combination of an identifier for the computing device, an identifier for a user of the computing device, and one or more identifiers for the one or more applications. In response to determining that there is a first notification for a first application, the method 500 may transmit a message to a first service platform associated with the first application to request the first notification at block 510. For example, the method 500 may transmit a message with a first application identifier and a user identifier to the first service platform. The method 500 may also transmit additional messages to additional service platforms if the method 500 determines that there are additional notifications available for the additional applications. In other embodiments, the method 500 may transmit a request for the notifications (e.g., entries in the ledger) to one or more nodes of the blockchain system at block 510. At block 515, the method 500 may receive the first notification from the first service platform (e.g., may receive a notification indicating that new emails have been received, may receive a notification recommending a product or streaming media content, etc.). The method 500 may also receive additional notifications for additional applications from additional service platforms if there are multiple notifications available. In addition, at block 515, the nodes of the blockchain system may also transmit the entries in response to the request transmitted at block 510. At block 520, the method 500 may provide the notification to the first application. For example, the method 500 may transmit the notification to the first application so that the first application may provide, display, or present the notification to a user of the computing device. The method 500 may also provide additional notifications to the additional applications if there are multiple notifications available.

Figure 6:
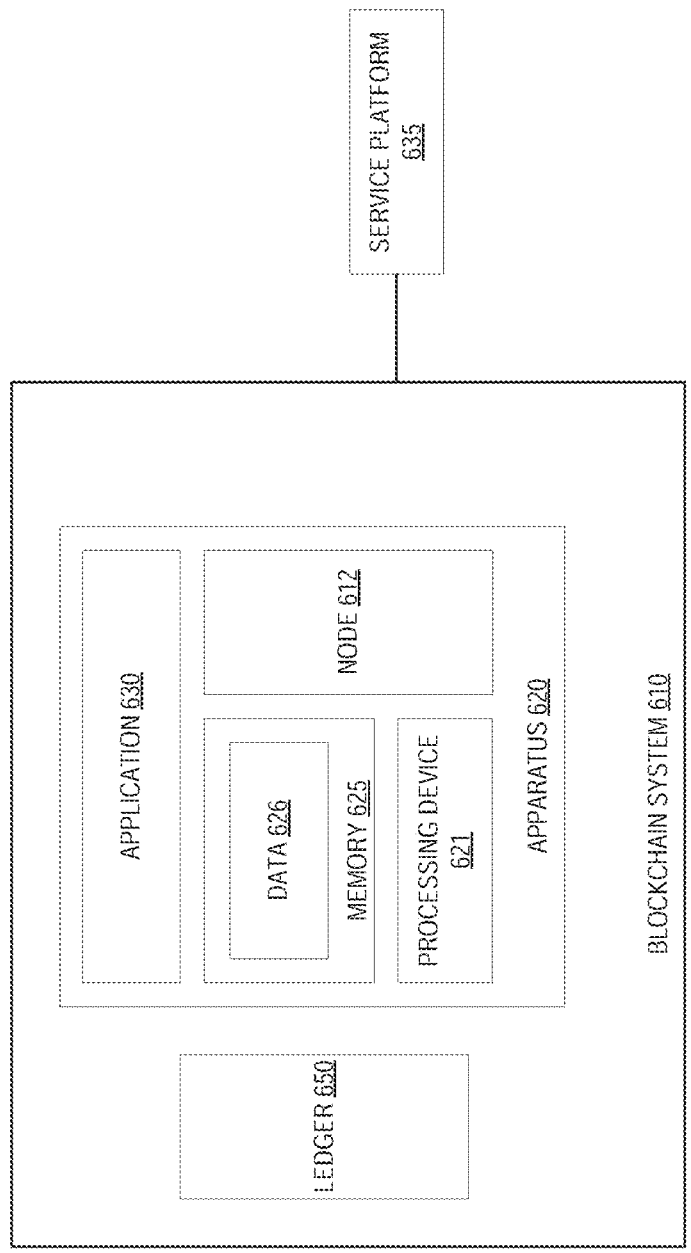
FIG. 6 is a block diagram of an example apparatus that may perform one or more of the operations described herein, in accordance with some embodiments of the present disclosure.

FIG. 6 is a block diagram of an example apparatus 620 that may perform one or more of the operations described herein, in accordance with some embodiments. The apparatus may include a node 612 of a block chain system 610. The apparatus 620 includes a memory 625 that sores data 626. The apparatus 620 also includes a processing device 621 operatively coupled to the memory 625. The processing device 621 may determine that a notification is available for an application 630 of the apparatus 620. The application 630 may be associated with a service platform 635. The processing device 621 may also update a ledger 650 of the blockchain system to indicate that the notification for the application is available.

Figure 7:
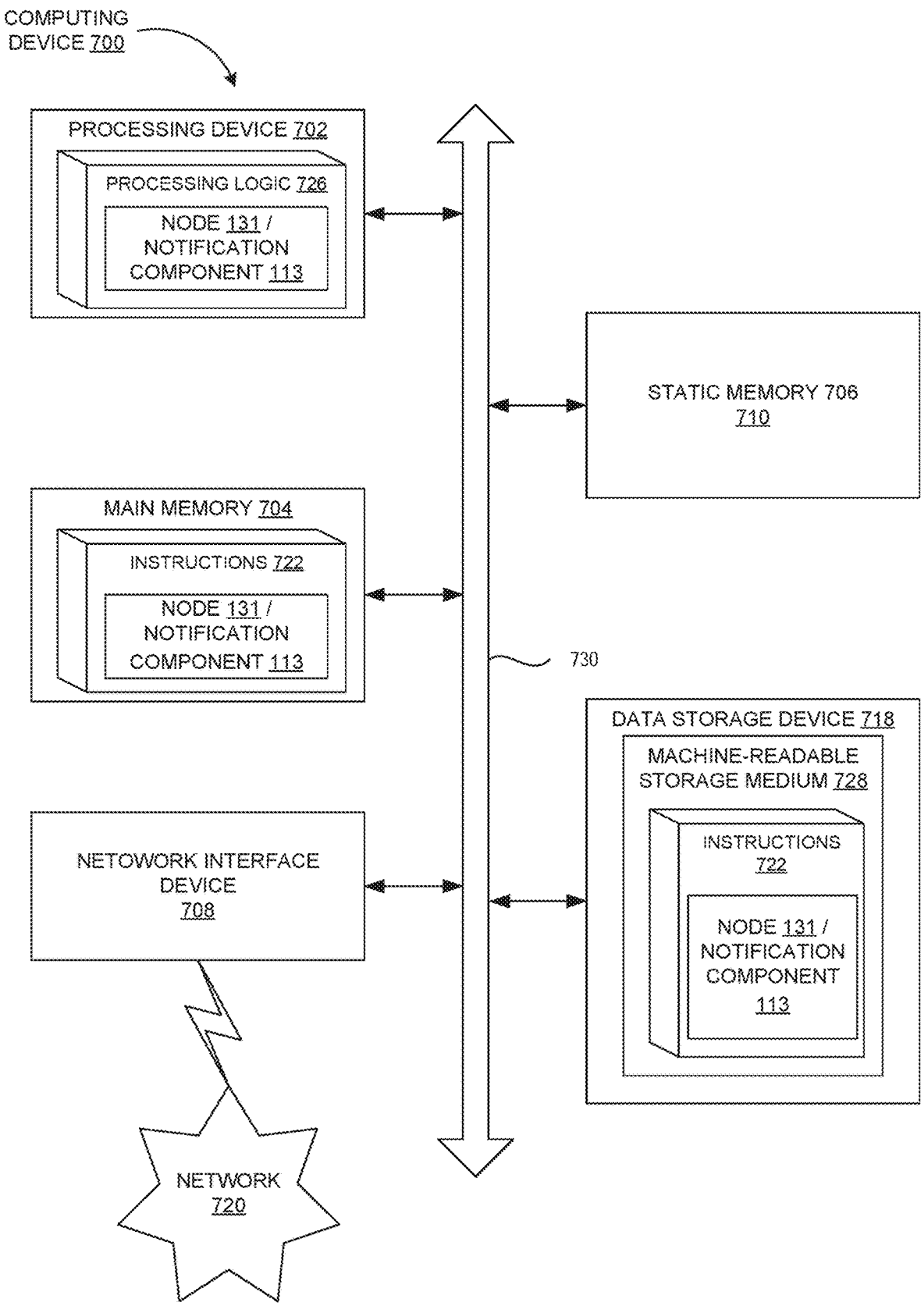
FIG. 7 is a block diagram of an example computing device that may perform one or more of the operations described herein, in accordance with some embodiments of the present disclosure.

FIG. 7 illustrates a diagrammatic representation of a machine in the example form of a computer system 700 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 700 may be representative of node, such as node 131 illustrated in FIG. 1.

The exemplary computer system 700 includes a processing device 702, a main memory 704 (e.g., read-only memory (ROM), flash memory, dynamic random access memory (DRAM), a static memory 706 (e.g., flash memory, static random access memory (SRAM), etc.), and a data storage device 718, which communicate with each other via a bus 730. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute processing logic 726, which may be one example of node 131, node 132, or notification component 113 of FIG. 1, for performing the operations and steps discussed herein.

The data storage device 718 may include a non-transitory machine-readable storage medium 728, on which is stored one or more set of instructions 722 (e.g., software) embodying any one or more of the methodologies of functions described herein, including instructions to cause the processing device 702 to execute node 131, node 132, or notification component 113. The instructions 722 may also reside, completely or at least partially, within the main memory 704 or within the processing device 702 during execution thereof by the computer system 700; the main memory 704 and the processing device 702 also constituting machine-readable storage media. The instructions 722 may further be transmitted or received over a network 720 via the network interface device 708.

The non-transitory machine-readable storage medium 728 may also be used to store instructions to perform a method for multi-level task debugging, as described herein. While the non-transitory machine-readable storage medium 728 is shown in an exemplary embodiment to be a single medium, the term "non-transitory machine-readable storage medium" should be taken to include a single medium or multiple media (e.g., a centralized or distributed database, or associated caches and servers) that store the one or more sets of instructions. A non-transitory machine-readable medium includes any mechanism for storing information in a form (e.g., software, processing application) readable by a machine (e.g., a computer). The non-transitory machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the non-transitory machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof.

What is claimed is:

1. A method, comprising:
    determining, by a node of a blockchain system, that a notification is available for an application of a computing device, wherein the application is associated with a service platform and associated with the computing device;
    determining, by the node of the blockchain system, that a threshold number of notifications for a plurality of applications are available; and
    updating, by the node of the blockchain system, a ledger of the blockchain system, in response to determining that the threshold number of notifications for the plurality of applications are available, to indicate that the notification for the application is available, wherein the ledger further indicates a plurality of notifications for a plurality of applications associated with a plurality of service platforms and associated with a plurality of computing devices.

2. The method of claim 1, wherein the computing device does not have permission to update the ledger.

3. The method of claim 1, further comprising:
    receiving a first message from the computing device to determine whether one or more notifications for one or more applications of the computing device are available;
    determining that the ledger indicates that the notification for the application is available; and
    transmitting a second message indicating that the notification is available to the computing device.

4. The method of claim 1, wherein the service platform comprises the node of the blockchain system.

5. The method of claim 1, wherein updating the ledger comprises:
    adding an entry to the ledger, wherein the entry comprises an indication that the notification for the application is available.

6. The method of claim 5, wherein adding the entry comprises:
    determining whether a period of time has elapsed; and
    adding the entry in response to determining that the period of time has elapsed.

7. The method of claim 1, further comprising:
    determining that the ledger indicates that one or more additional notifications for one or more additional applications are available; and
    transmitting a message indicating that the one or more additional notifications are available.

8. A method, comprising:
    checking, by a processing device, a ledger of a blockchain system to determine whether one or more notifications are available for one or more applications of a computing device, wherein the ledger further indicates a plurality of notifications for a plurality of applications associated with a plurality of service platforms and associated with a plurality of computing devices;
    determining, by the processing device, that a threshold number of notifications for the plurality of applications are available;
    updating, by the processing device, the ledger of the blockchain system, in response to determining that the threshold number of notifications for the plurality of applications are available;
    transmitting a first message to a first service platform associated with a first application of the computing device to request a first notification in response to determining that the first notification is available for the first application; and
    receiving the first notification from the first service platform.

9. The method of claim 8, wherein checking the ledger of the blockchain system comprises:
    transmitting a second message to the blockchain system to determine whether the one or more notifications for the one or more applications of the computing device are available; and
    receiving a third message from the blockchain system indicating that the first notification is available for the first application of the computing device.

10. The method of claim 9, wherein the second message is transmitted by a notification component of the computing device, wherein the notification component is to determine whether notifications for multiple applications of the computing device are available.

11. The method of claim 10, wherein the notification component is further to:
    provide the first notification to the first application.

12. The method of claim 9, wherein the second message further indicates that a second notification is available for a second application of the computing device and wherein the method further comprises:
    transmitting a fourth message to a second service platform associated with the second application to request the second notification; and
    receiving the second notification from the second service platform.

13. An apparatus comprising comprising:
    a memory to store data; and
    a processing device, operatively coupled to the memory, the processing device to:
    determine that a notification is available for an application of a computing device, wherein the application is associated with a service platform and associated with the computing device;
    determine that a threshold number of notifications for a plurality of applications are available; and
    update a ledger of a blockchain system, in response to determining that the threshold number of notifications for the plurality of applications are available, to indicate that the notification for the application is available, wherein the ledger further indicates a plurality of notifications for a plurality of applications associated with a plurality of service platforms and associated with a plurality of computing devices.

14. The apparatus of claim 13, wherein the processing device is further to:
   receive a first message from the computing device to determine whether one or more notifications for one or more applications of the computing device are available; and
   determine that the ledger indicates that the notification for the application is available; and
   transmit a second message indicating that the notification is available to the computing device.

15. The apparatus of claim 13, wherein to determine that the notification is available the processing device is further to:
   receive, from the service platform by a node of the blockchain system, a message indicating that the notification is available, wherein the service platform is separate from the blockchain system.

16. The apparatus of claim 13, wherein the service platform comprises a node of the blockchain system.

17. The apparatus of claim 13, wherein to update the ledger the processing device is further to:
   add an entry to the ledger, wherein the entry comprises an indication that the notification for the application is available.

18. The apparatus of claim 17, wherein the entry further comprises one or more of:
   an identifier for the computing device;
   an identifier for a user of the computing device; and
   an identifier for the application.

* * * * *